United States Patent [19]

Fornuto et al.

[11] Patent Number: 4,683,862

[45] Date of Patent: Aug. 4, 1987

[54] FUEL VAPOR STORAGE CANISTER

[75] Inventors: Joseph Fornuto, Rochester; William E. Gifford, Hemlock; Karen M. Meyer, Webster, all of N.Y.

[73] Assignee: General Motors Corporation, Detroit, Mich.

[21] Appl. No.: 918,887

[22] Filed: Oct. 15, 1986

Related U.S. Application Data

[63] Continuation-in-part of Ser. No. 851,547, Apr. 14, 1986.

[51] Int. Cl.[4] ...................... F02M 59/00; B01D 50/00

[52] U.S. Cl. .................................. 123/520; 123/519; 55/387

[58] Field of Search .............. 123/520, 521, 516, 518, 123/519, 514; 55/387, 316, DIG. 28

[56] References Cited

U.S. PATENT DOCUMENTS

| | | | |
|---|---|---|---|
| Re. 26,169 | 3/1967 | Hall | 123/519 |
| 3,191,587 | 6/1965 | Hall | 123/520 |
| 3,352,294 | 11/1967 | Biller | 123/520 |
| 3,393,669 | 7/1968 | Vardi | 123/520 |
| 3,575,152 | 4/1971 | Wentworth | 123/520 |
| 3,646,731 | 3/1972 | Hansen | 123/520 |
| 3,727,597 | 4/1973 | Hensler | 123/519 |
| 3,759,234 | 9/1973 | Buckton | 123/520 |
| 4,203,401 | 5/1980 | Kingsley | 123/520 |
| 4,280,466 | 7/1981 | Walters | 123/520 |
| 4,395,991 | 8/1983 | Miyachi | 123/520 |
| 4,496,379 | 1/1985 | Kozawa | 123/519 |

FOREIGN PATENT DOCUMENTS

| | | | |
|---|---|---|---|
| 1217347 | 12/1970 | United Kingdom | 123/520 |

*Primary Examiner*—Carl Stuart Miller
*Attorney, Agent, or Firm*—C. K. Veenstra

[57] ABSTRACT

A canister adapted to store fuel vapor discharged from a fuel tank has an inlet chamber at one end that forms a trap for liquid fuel. Fuel is purged from the canister through a purge tube that has a small liquid purge hole at the bottom of the chamber and a large vapor purge hole spaced above the bottom of the chamber.

2 Claims, 2 Drawing Figures

FUEL VAPOR STORAGE CANISTER

RELATED APPLICATIONS

This is a continuation-in-part of patent application Ser. No. 851,547 still pending filed Apr. 14, 1986.

The preferred embodiment of this fuel vapor storage canister also employs the invention set forth in patent application Ser. No. 851548 filed Apr. 14, 1986 in the names of C. H. Covert, W. E. Gifford, C. G. Kemler, and G. R. Paddock.

TECHNICAL FIELD

This invention relates to control of fuel vapor released from a fuel tank.

SUMMARY OF THE INVENTION

During day to day operation of an automotive vehicle, the temperature of the vehicle fuel tank rises and falls. As the fuel tank temperature rises, some of the fuel vapor in the space above the liquid level is displaced out of the tank. To avoid releasing the fuel vapor to the atmosphere, the existing system vents the vapor to a canister having a bed that adsorbs and stores the fuel vapor.

This invention provides a canister installed with a horizontal axis and having an inlet chamber at one end that forms a trap for liquid fuel. The trap protects the vapor storage bed against absorption of liquid fuel and thereby preserves the bed for adsorption of fuel vapor.

The details as well as other features and advantages of a preferred embodiment of this invention are set forth in the remainder of the specification and are shown in the drawing.

THE PREFERRED EMBODIMENT

Figure 1:
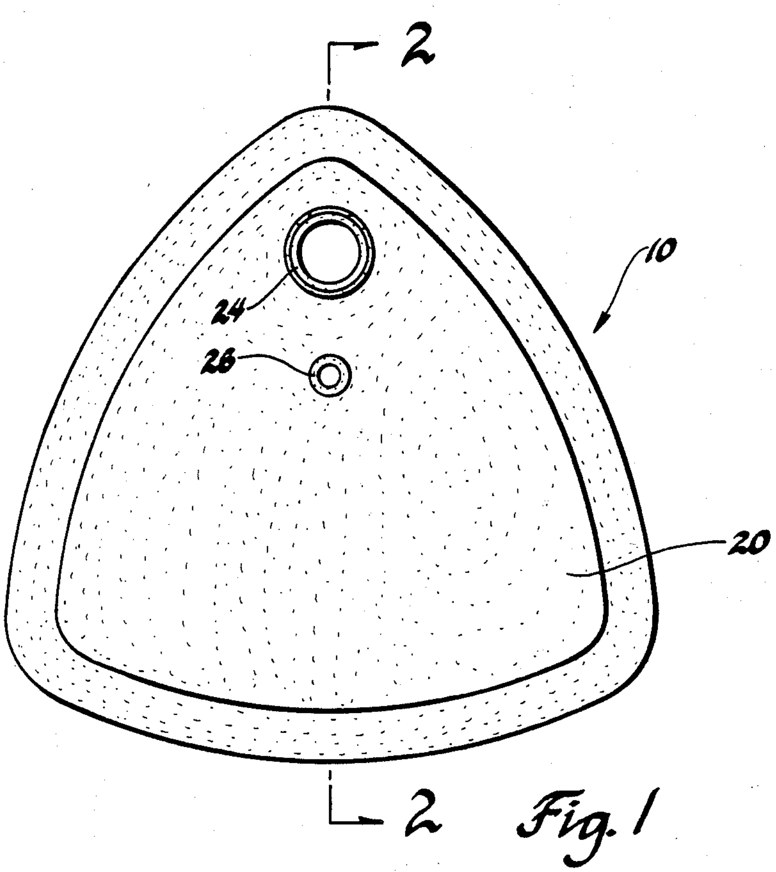
FIG. 1 is an end elevational view of a preferred embodiment of a fuel vapor storage canister employing this invention.

Referring to the drawing, a fuel vapor storage canister 10 with a horizontal axis has a bed 12 of activated carbon adapted to adsorb fuel vapor. Bed 12 is supported between foam screens 14 and 16 within a housing 18.

Figure 2:
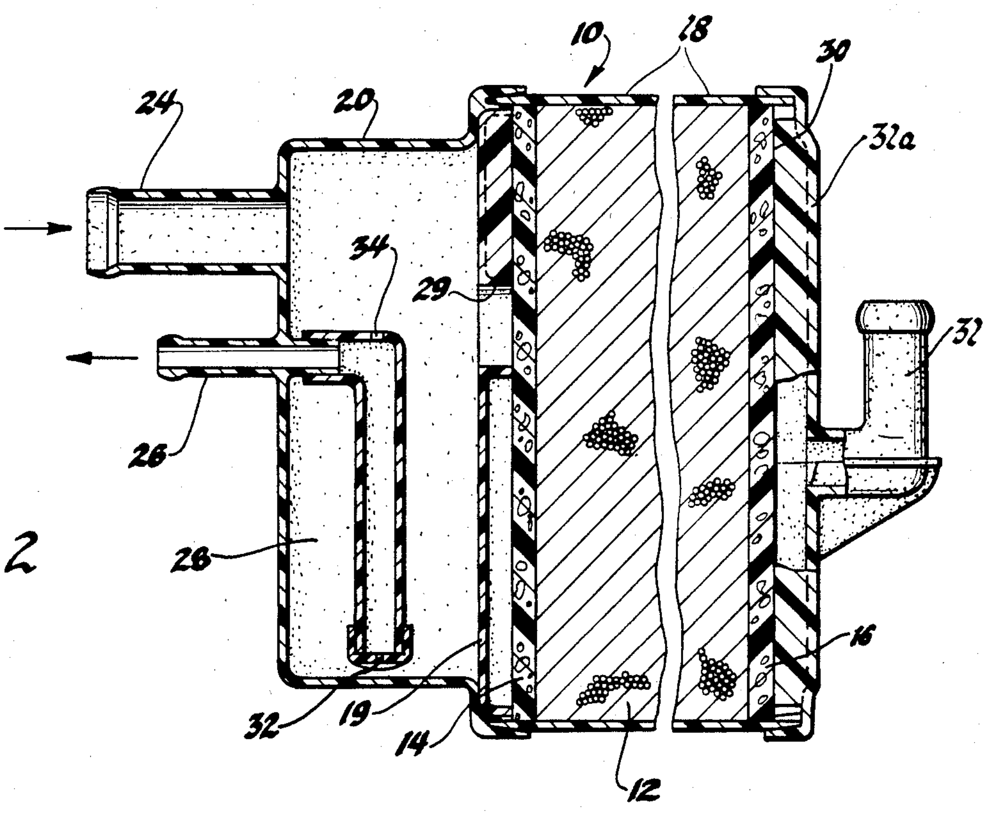
FIG. 2 is a sectional view of the canister, taken along line 2—2 of FIG. 1.

At the left end of canister 10, as viewed in FIG. 2, housing 18 is closed by a partition 19 and a cover 20. A fuel vapor inlet tube 24 and a purge tube 26 are formed as part of cover 20 and open into an inlet chamber 28 between cover 20 and partition 19. Chamber 28 opens to bed 12 through an aperture 29 in partition 19, aperture 29 being spaced substantially above the bottom of chamber 28.

The region 30 at the right end of canister 10 is open to the atmosphere though the vent tube 31 of a cover 31*a*. Vapor inlet tube 24 receives a mixture of fuel vapor and air discharged from a fuel tank (not shown). As the mixture flows through chamber 28, aperture 29 and bed 12, the activated carbon in bed 12 adsorbs the fuel vapor and the air flows out through vent tube 31.

Chamber 28 serves as a trap to capture any liquid fuel that may be present in the mixture of fuel vapor and air received through inlet tube 24. By capturing the liquid fuel before it reaches bed 12, bed 12 is protected against absorption of liquid fuel, and the activated carbon is thereby preserved for adsorption of fuel vapor.

Fuel is purged from canister 10 by applying vacuum to purge tube 26. Purge tube 26 has a small liquid purge hole 32 about 0.020 in (0.5 mm) in diameter at the lower end and a large vapor purge hole 34 about 0.110 in (2.79 mm) in diameter near the top. The vacuum applied through vapor purge hole 34 draws air from vent tube 31 through bed 12, and into chamber 28. The air flow through bed 12 desorbs the fuel vapor, and the resulting mixture of air and fuel vapor is drawn out through purge tube 26. The vacuum applied through liquid purge hole 32 gradually purges the liquid fuel from chamber 28, and the liquid fuel is drawn out through purge tube 26 along with the mixture of air and fuel vapor.

It will be noted that canister 10 has a generally triangular configuration with the apex of the triangle at the top. This construction maximizes the capacity at the base of chamber 28 to minimize the possibility that liquid might be transferred through aperture 29 into bed 12.

The embodiments of the invention in which an exclusive property or privilege is claimed are defined as follows:

1. A fuel vapor storage canister comprising a housing having a bed of material adapted to adsorb fuel vapor, and a cover defining an inlet chamber at one end of said bed and separated from said bed by a partition, said canister having a region vented to the atmosphere at the other end of said bed, said inlet chamber and bed and region being aligned along a horizontal axis, said partition having an aperture opening from said chamber to said bed with said aperture being spaced substantially above the bottom of said chamber, a fuel vapor inlet tube opening to said inlet chamber whereby fuel vapor may be introduced to said canister and flow from said chamber through said aperture into said bed and said bed may adsorb said fuel vapor, and a purge tube opening to said inlet chamber whereby vacuum applied to said purge tube may cause air to flow from said region through said bed and said aperture to said chamber and whereby said air flow may desorb fuel vapor from said bed, and wherein said purge tube has a liquid purge hole disposed near the bottom of said chamber and a vapor purge hole spaced substantially above the bottom of said chamber, whereby said chamber may serve as a trap for liquid fuel introduced through said inlet tube, and whereby said liquid fuel may be purged from said chamber along with said air flow and desorbed fuel vapor.

2. A fuel vapor storage canister comprising a housing having a bed of material adapted to adsorb fuel vapor, and a cover defining an inlet chamber at one end of said bed and separated from said bed by a partition, said chamber having a generally triangular configuration in vertical cross section, said canister having a region vented to the atmosphere at the other end of said bed, said inlet chamber and bed and region being aligned along a horizontal axis, and with an apex of said triangular configuration uppermost, said partition having an aperture opening from said chamber to said bed with said aperture being spaced substantially above the bottom of said chamber, a fuel vapor inlet tube opening to said inlet chamber whereby fuel vapor may be introduced to said canister and flow from said chamber through said aperture into said bed and said bed may adsorb said fuel vapor, and a purge tube opening to said inlet chamber whereby vacuum applied to said purge tube may cause air to flow from said region through said bed and said aperture to said chamber and whereby said air flow may desorb fuel vapor from said bed, and wherein said purge tube has a liquid purge hole disposed near the bottom of said chamber and a vapor purge hole spaced substantially above the bottom of said chamber, whereby said chamber may serve as a trap for liquid fuel introduced through said inlet tube, and whereby said liquid fuel may be purged from said chamber along with said air flow and desorbed fuel vapor.

* * * * *